United States Patent

Imanari

[11] Patent Number: 5,731,913
[45] Date of Patent: Mar. 24, 1998

[54] LENS BARREL WITH IMPROVED CAM RING STRUCTURE

[75] Inventor: Hitoshi Imanari, Kanagawa-ken, Japan

[73] Assignee: Nikon Corporation, Tokyo, Japan

[21] Appl. No.: 555,014

[22] Filed: Nov. 13, 1995

[30] Foreign Application Priority Data

Nov. 24, 1994 [JP] Japan .................... 6-314100

[51] Int. Cl.$^6$ .................................. G02B 15/14
[52] U.S. Cl. .................. 359/700; 359/699; 359/701
[58] Field of Search ...................... 369/699, 700, 369/701

[56] References Cited

U.S. PATENT DOCUMENTS

| | | | |
|---|---|---|---|
| 4,950,060 | 8/1990 | Nagasaka | 359/701 |
| 5,225,939 | 7/1993 | Iizuka. | |
| 5,255,124 | 10/1993 | Iwamura | 359/694 |
| 5,446,593 | 8/1995 | Hamasaki | 359/704 |

FOREIGN PATENT DOCUMENTS

A-4-83212  3/1992  Japan.

Primary Examiner—David C. Nelms
Assistant Examiner—Evelyn A. Lester
Attorney, Agent, or Firm—Oliff & Berridge, PLC

[57] ABSTRACT

A lens barrel capable of high precision in the positional relationship of two cams by providing the two cams on one cam member is disclosed. Additionally, freedom of positioning the cams is increased by providing the two cams along a common radial line from a center line of the member while maintaining rigidity of the member. The cam member includes at least one cam groove on an inner surface and at least one cam protuberance on an outer surface for engagement with engagement members on an inner surface of a cylindrical member.

18 Claims, 5 Drawing Sheets

LENS BARREL WITH IMPROVED CAM RING STRUCTURE

BACKGROUND OF THE INVENTION

1. Field of the Invention

The present invention relates to the lens barrel of a zoom lens having a cam structure.

2. Description of Related Art

Conventionally, when the cam structure of a zoom lens includes a cam member made of metal, a cam groove that penetrates from the outside of the cam member is provided by machining, or a cam on the inside of the cam member that does not penetrate to the outside is provided by machining.

In addition, when the cam ring is made of synthetic resin, in the case of a two-unit zoom lens, a projecting cam controlling the second lens unit is provided on an inner radius of the cam ring, and a second lens unit frame engages this projecting cam, while a projecting cam that controls the first lens unit is provided on an inner radius of the adjustment barrel provided on the outside of the cam ring. Additionally, a lens unit that holds the projecting cam is provided on the outside of the cam ring, as noted in the disclosure of Japanese Laid-Open Patent Application No. 4-83212.

However, when a plurality of cams are machined on the metal cam ring, the problem arises that deformation caused by the processing can occur if a suitable space is not provided between the cams and, furthermore, cam structures in which a radial line from a center line of the cam ring intersects both cams are also difficult to machine.

When the cam ring is made of synthetic resin, different members are provided with the cam for the first lens unit and with the cam for the second lens unit in the two-unit structure. Such a structure is disclosed in Japanese Laid-Open Patent Application No. 4-83212. With that design, the number of molded members that require high precision increases, thus increasing production costs.

SUMMARY OF THE INVENTION

It is an object of the present invention to provide high precision in the positional relationship of two cams for moving two lens units by providing the two cams on one member. In addition, it is an object to provide more freedom of positioning of the cams by making feasible a structure in which a radial line from the center line of the cam ring passes through both of the cams.

In order to achieve the above and other objectives, the lens barrel of the present invention includes a cam ring having a cam recess on an inner radius and cam protuberances on an outer radius; and a cylindrical member having engagement members on an inner radius that engage with the projecting cam.

With the lens barrel as described above, the cam recess and the cam protuberances are provided on an inner radius and an outer radius, respectively, of the cylindrical member. By providing the two cam structures on one member, high precision in the positional relationship of the two cam structures is feasible. In addition, because the two cam structures are provided on the inner radius and the outer radius, more freedom of positioning of the cam structures is created by making feasible a structure in which some radial lines from a center line of the cam ring pass through both cam structures.

BRIEF DESCRIPTION OF THE DRAWINGS

Preferred embodiments of the present invention are described hereafter, with reference to the drawings, wherein.

DETAILED DESCRIPTION OF PREFERRED EMBODIMENTS

Figure 1:
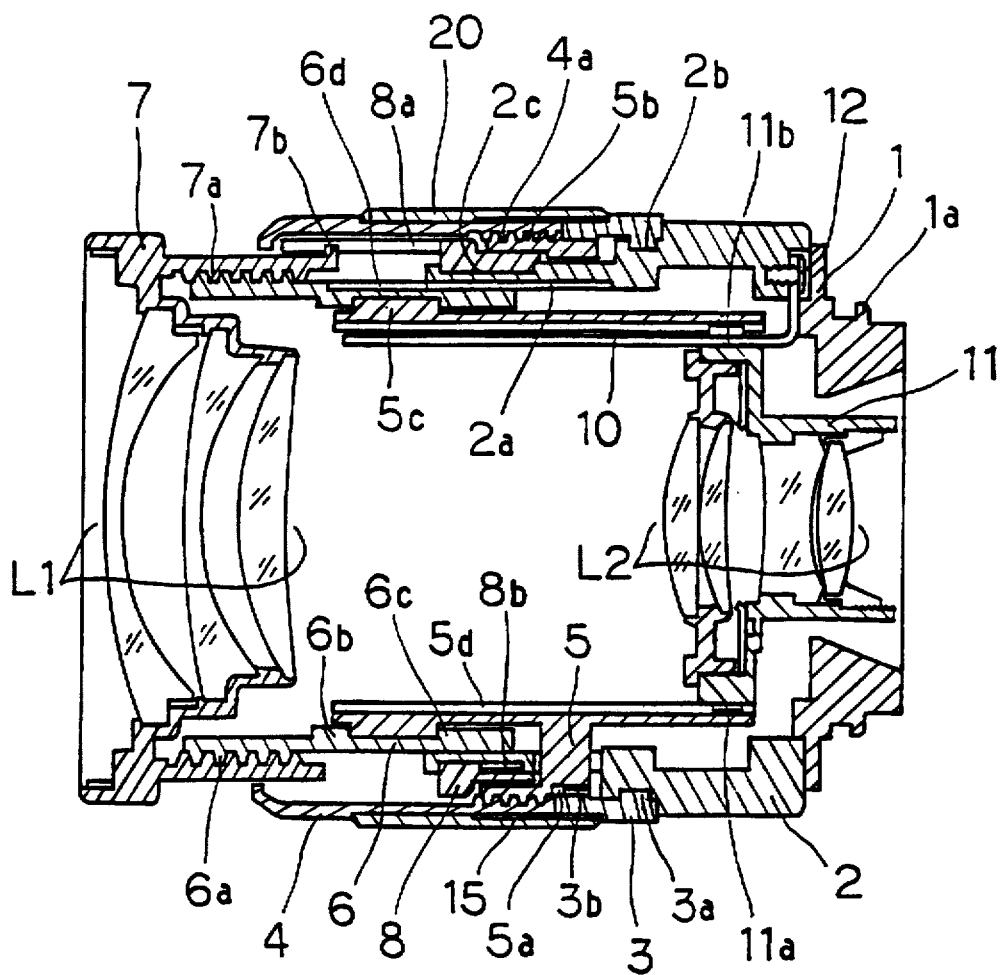
FIG. 1 is a cross-sectional view of an embodiment of a lens barrel according to the present invention.

FIG. 1 is a cross-sectional view of an embodiment of a lens barrel of the present invention. With reference to FIG. 1, the lens barrel includes a fixed mount with a male connection for mating with a female connection on a camera mount, including a bayonet section 1a of the fixed mount. A member 2 is integral with the mount 1. Linear advancement keys 2a project from the inner radius of the member 2. Circumferential guide groove 2b extends around the optical axis on the outer radius of member 2. Circumferential guide groove 2c extends around the optical axis on the outer radius of the forward portion of the member 2.

A zoom ring 3 controls zooming by rotation about the optical axis. Pins 3a project from the inner radius of the zoom ring in three locations on the inner radius of zoom ring 3 and engage the guide groove 2b. A linear key 3b projects from the inner radius of the forward end of zoom ring 3. An adjustment member 4 may be fixed to the zoom ring 3 by adhesive tape 15 to rotate integrally with the zoom ring 3 following assembly and flange back focal distance adjustment. A female helicoid screw 4a is provided on the inner radius of the adjustment member 4.

A cam ring 5 includes a linear guide groove 5a on the rearward outer radius of the cam ring 5. A male helicoid screw 5b is provided on the outer radius of the cam ring 5 to mesh with helicoid screw 4a. In addition, cam protuberances 5c are provided on the forward outer radius of the cam ring 5 for controlling the movement of the first lens unit L1 (see FIGS. 2 and 5). The protuberances 5c are in the shape of a continuous arc in a radial plane from a center line of the cam ring. In addition, cam grooves 5d are provided on the inner radius of the cam ring 5 (see FIGS. 3 and 5) for controlling movement of the second lens unit L2.

A cylindrical member 6 includes protuberances 6b and 6c, that operate as cam followers, on the inner radius (see FIGS. 4 and 5), and includes a helicoid screw 6a on an outer radius at its forward end with a linear advancement guide groove 6d also provided on an outer radius at its rearward end. The cam followers 6b and 6c operate as engagement members defining an engagement unit that engages with the cam protuberances 5c. As shown in FIG. 5, the cam followers 6b and 6c have peripheries of convex shape in the direction of the optical axis that face each other for holding a cam protuberance 5c between the two facing peripheries. A holding frame 7 supports the first lens unit L1. A female helicoid screw 7a is provided on the inner radius of holding frame 7 and a key 7b is provided on the outer radius of holding frame 7.

A drive ring 8 rotates around the optical axis by a drive gear (not shown in the figures) and includes a key 8a in the direction of the optical axis for rotatively coupling drive ring 8 and holding frame 7 to mesh with key 7b, and a gear 8b for driving is provided on the inner radius of drive ring 8. A linear guide member 10 is fastened and fixed to the member 2 by a set screw 12. A holding frame 11 holds the second lens unit L2. Holding frame 11 includes link protuberances 11a on the outer radius of holding frame 11 that engage with the cam groove 5d and a guide groove 11b that engages with the linear guide member 10. An adhesive tape 15 fixes the zoom ring 3 and the adjustment member 4 together following flange back focal distance adjustment, and a rubber ring 20 covers the zoom ring 3 and the adjustment member 4 following fixing by the adhesive tape 15.

Figure 2:
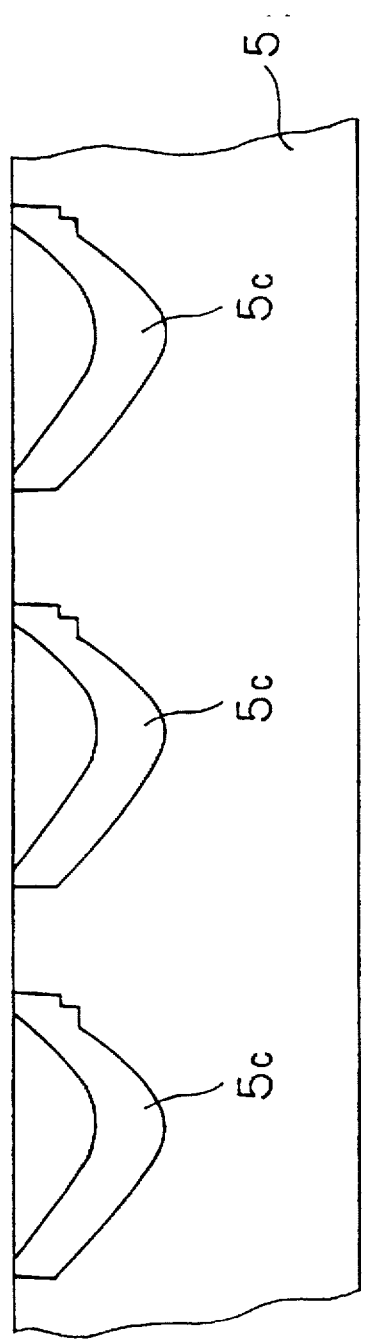
FIG. 2 is a linearly presented view of a cam ring of the embodiment of FIG. 1.
Figure 3:
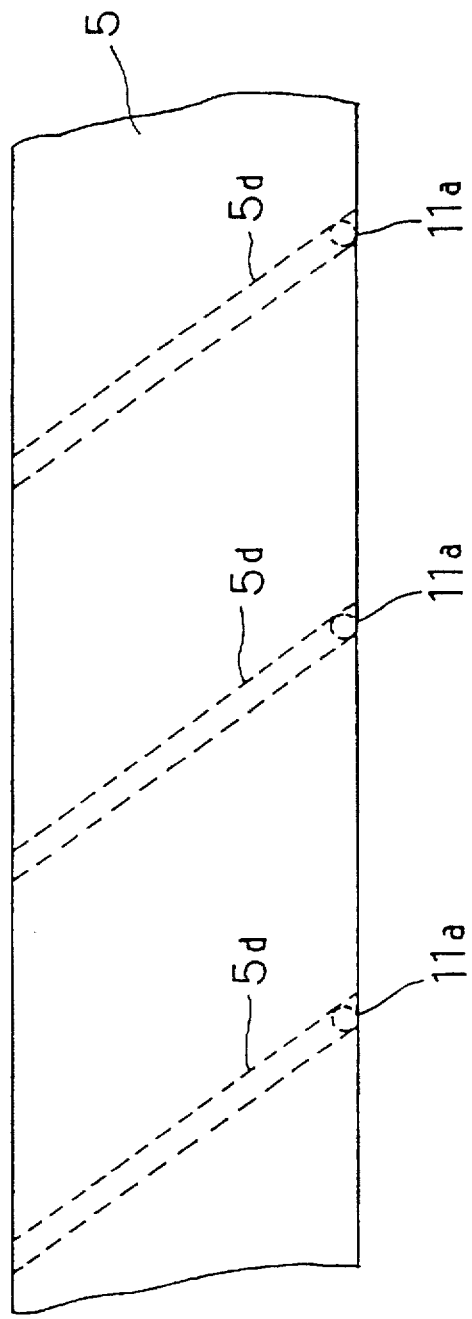
FIG. 3 is a linearly presented view of a cam ring of the embodiment of FIG. 1.
Figure 4:
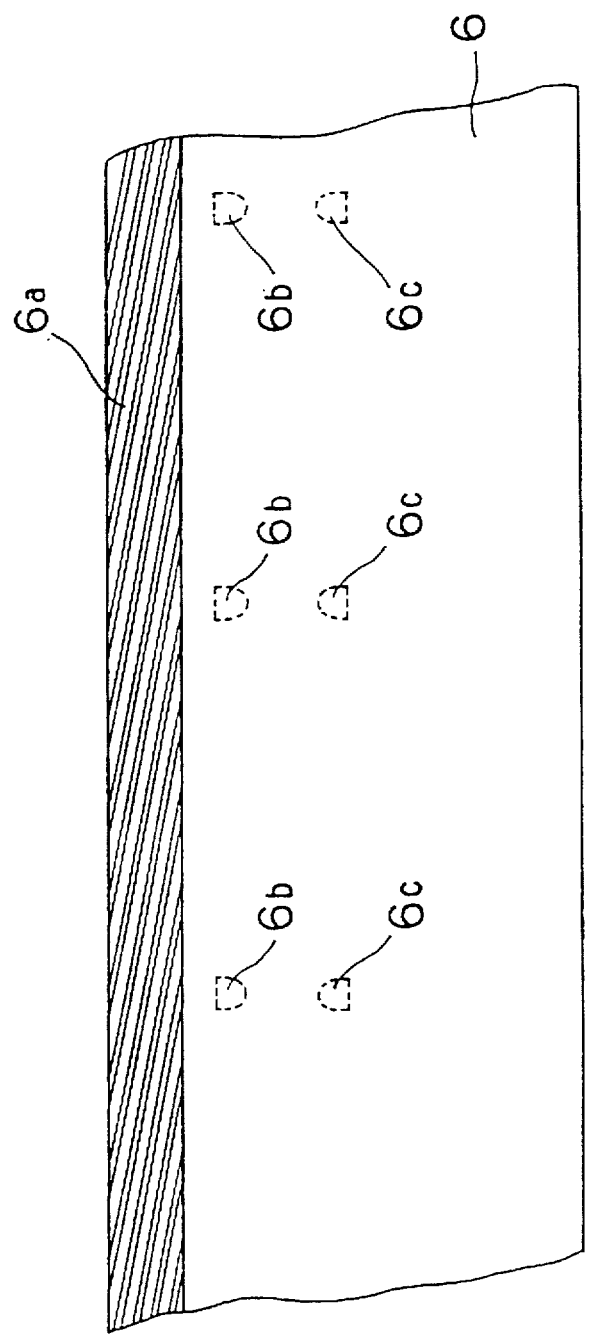
FIG. 4 is a linearly presented view of an adjustment member of the embodiment of FIG. 1.
Figure 5:
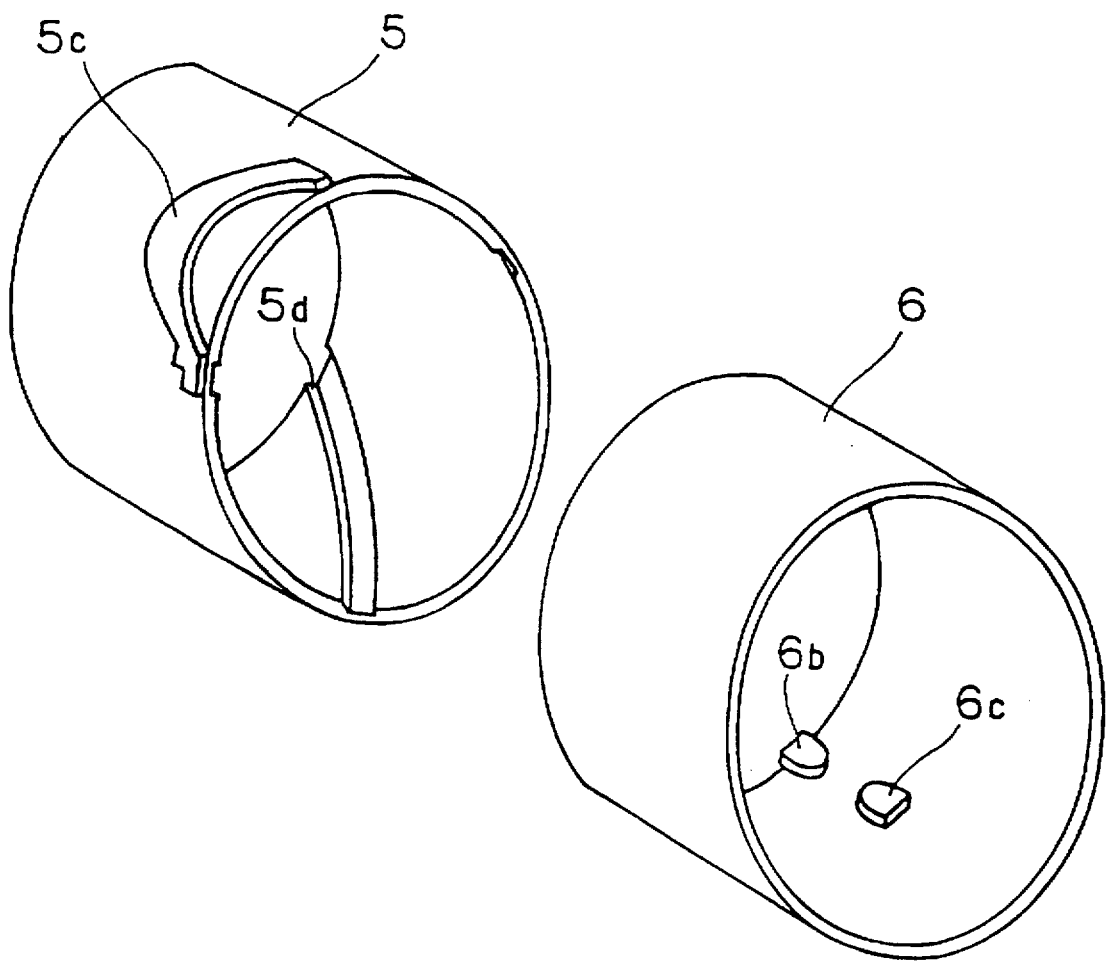
FIG. 5 is an exploded oblique view of a cam ring and adjustment member of the embodiment of FIG. 1.

FIGS. 2–4 are linearly presented views of the cam sections of the embodiment of FIG. 1. In addition, FIG. 5 is an exploded oblique view of the cylindrical member 6 and the cam ring 5.

As shown in FIGS. 2–3, cam protuberances on the outer perimeter of the forward end of cam ring 5 and cam grooves 5d on the inner radius of the cam ring 5 are positioned so that some radial lines from the center line of the cam ring pass through both of those cam structures without creating problems related to strength or mechanical operation. As shown in FIG. 4, the cylindrical member 6 that controls the movement of the first lens unit L1 has cam followers 6b and 6c on an inner radius, has a helicoid screw 6a on an outer radius at its forward end, and has a linear guide groove 6d (FIG. 1) on the rearward end of the outer radius cylindrical member 6.

The inner radius of the cylindrical member 6 is larger than the outer radius of the cam barrel 5. With reference to FIG. 5, the cam ring 5 is inserted into the cylindrical member 6 so that the cam protuberances 5c (in three locations) are interposed between the cam followers 6b and 6c (in three locations). For clarity of illustration, the helicoid screw 6a on the outer surface of cylindrical member 6 is omitted in FIG. 5.

With the above-described construction, when the zoom ring 3 rotates around the optical axis, the adjustment member 4 and the cam ring 5, which are fixed to the zoom ring 3 rotate around the optical axis. Because the cam protuberances 5c rotate around the optical axis, the cylindrical member 6 moves forward and backward in the optical axis direction by engagement of the cam followers 6b and 6c with the cam protuberances 5c, the cam protuberances 5c being between cam followers 6b and 6c, and by the operation of the linear channel 6d that engages linear key 2a of the member 2. The holding frame 7 of the first lens unit L1 with female helicoid screw 7a that engages male helicoid screw 6a of the cylindrical member 6 also undergoes zooming movement with cylindrical member 6 in the direction of the optical axis. On the other hand, when the cam barrel 5 rotates, through the operation of the interlocking protrusion 11a (see FIGS. 1 and 3) of the second lens holding frame 11 that engages with the cam groove 5d on the inner radius of the cam barrel 5, and the operation of the guide groove 11b that engages with the linear guide member 10, the second lens unit L2 undergoes zooming movement in the direction of the optical axis.

The first lens unit L1 is a focussing lens unit, and when the support frame 7 rotates, holding frame 7 moves in the direction of the optical axis through the driving operation of the helicoid screws 7a and 6a for focussing. Because key 7b rotates and connects with the key 8a for interlocking with the drive ring 8, the drive ring 8 rotates when focussing. The drive ring 8 is restricted by the guide groove 2c of the member 2 so that only rotation around the optical axis is possible. When motor and gear autofocus drive is conducted, the drive ring 8 rotates around the optical axis by a gear 8b coupled to a driving gear (not shown in the figures).

Next, flange back focal distance adjustment will be described. With the zoom lens, errors occur in the in-focus position of the optical system due to variances in the production of the components. In order to eliminate these errors, the position of the focussing lens (the first lens unit L1) is adjusted in the direction of the optical axis by washer adjustment and shifting of the rotation restriction position prior to flange back focal distance adjustment. Flange back focal distance adjustment is made so that movement of the focal plane is not created due to zooming at either the wide-angle side or the telephoto side. When this focus movement adjustment is conducted, the flange back of the lens barrel is shifted.

When the adjustment member 4 is caused to rotate around the optical axis due to this flange back adjustment, the cam ring 5 moves in the direction of the optical axis by rotating and interlocking with the zoom ring 3 due to the engagement of the helicoid screw 5b of the cam ring 5 with the helicoid screw 4a of the adjustment member 4, and the operation of the linear key 3b of the zoom ring 3 that engages with the linear guide groove 5a of the cam ring 5. In addition, the entire optical system is supported in the cam ring 5. Thus, flange back focal distance adjustment is possible by rotating the adjustment member 4. Following flange back focal distance adjustment, the adjustment member 4 and the zoom ring 3 are fixed together by adhesive tape 15, and the zoom ring 3 and adjustment member 4 are covered by a rubber ring 20.

As described above, with the lens barrel of the invention, it is possible to provide high precision in the positional relationship of the two cam structures by providing a cam recess and cam protuberances on the inner radius and the outer radius, respectively, of the cylindrical member, thereby providing the two cam structures on one member. In addition, because the two cam structures are provided on the inner radius and the outer radius, it is feasible to have radial lines from the center line of the cam ring pass through both cam structures thereby providing more freedom of cam positioning.

While this invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention as defined in the following claims.

What is claimed is:

1. A lens barrel, comprising:

a cam ring including a cam recess on an inner surface of the cam ring and at least one cam protruding from an outer surface of the cam ring; and a cylindrical member having an inner surface and including a first engagement member engageable with the at least one cam, wherein the cam recess and the cam are arranged so that a radial line from a longitudinal center line of the cam ring passes through both the cam recess and the cam, said cam ring being disposed so that it cannot move along the longitudinal center line of the cam ring after a back adjustment.

2. The lens barrel of claim 1, further comprising a second engagement member, wherein each engagement member of said first and second engagement members comprises a protuberance opposing and separated from a protuberance of the other engagement member to hold the at least one cam protuberance between the opposing protuberances of said first and second engagement members.

3. The lens barrel of claim 1, wherein the cam recess and the cam structure are arranged so that a radial line from a center line of the cam ring passes through both the cam recess and the cam structure.

4. The lens barrel of claim 1, wherein the cam recess is a cam groove.

5. The lens barrel of claim 4, wherein the cam groove extends substantially from one end of the cam ring to the other end of the cam ring.

6. The lens barrel of claim 1, wherein the at least one cam protuberance is in the shape of a continuous arc.

7. The lens barrel of claim 1, wherein a plurality of cam protuberances are provided on the outer surface of the cam ring.

8. The lens barrel of claim 7, further comprising a first and a second engagement member associated with each of said plurality of cam protuberances, wherein the first and second engagement members are arranged in pairs with each first engagement member comprising a protuberance separated from and opposing a protuberance of the second engagement member to hold one of the plurality of cam protuberances between each opposing pair of protuberances.

9. The lens barrel of claim 7, wherein each cam protuberance is in the shape of a continuous arc.

10. A lens barrel, comprising:
a cam ring including first cam means on an inner surface of the cam ring for receiving a first cam structure that reduces a cross-section of a portion of the cam ring in a radial direction from a longitudinal center line of the cam ring and including second cam means on an outer surface of the cam ring that does not reduce a cross-section of any portion of the cam ring in a radial direction from the longitudinal center line of the cam ring; and
a cylindrical member having an inner surface and including a cam following means for engagement with the second cam means,
wherein the first cam means and the second cam means are arranged so that a radial line from the longitudinal center line of the cam ring passes through both the first cam means and the second cam means, said cam ring being disposed so that it cannot move along the longitudinal center line of the cam ring after a back adjustment.

11. The lens barrel of claim 10, wherein said cam following means includes two engagement members, wherein each engagement member comprises a protuberance separated from and opposing a protuberance of the other engagement member to hold the second cam means between the two protuberances of the engagement members.

12. The lens barrel of claim 11, wherein each protuberance of each engagement member includes a convex curved periphery to contact the second cam means.

13. The lens barrel of claim 10, wherein the first cam means is a cam groove.

14. The lens barrel of claim 13, wherein the cam groove extends substantially from one end of the cam ring to the other end of the cam ring.

15. The lens barrel of claim 10, wherein the second cam means includes at least one cam protuberance that is in the shape of a continuous arc on the outer surface of the cam ring.

16. The lens barrel of claim 10, wherein the second cam means includes a plurality of cam protuberances provided on the outer surface of the cam ring.

17. The lens barrel of claim 16, further comprising a first and a second engagement member associated with each of said plurality of cam protuberances, wherein the first and second engagement members are arranged in pairs with each first engagement member comprising a protuberance separated from and opposing a protuberance of the second engagement member to hold one of the plurality of cam protuberances between each opposing pair of protuberances.

18. The lens barrel of claim 16, wherein at least one of said plurality of cam protuberances is in the shape of a continuous arc.

* * * * *